United States Patent [19]
Bodin et al.

[11] Patent Number: 5,540,303
[45] Date of Patent: Jul. 30, 1996

[54] WHEEL HUB AND BRAKE DISC ARRANGEMENT FOR HEAVY VEHICLES

[75] Inventors: Jan-Olof Bodin, Alingsås; Ingemar Dagh, Hisingsbacka, both of Sweden

[73] Assignee: AB Volvo, Gothenburg, Sweden

[21] Appl. No.: 335,752

[22] PCT Filed: Jun. 2, 1993

[86] PCT No.: PCT/SE93/00490

§ 371 Date: Nov. 14, 1994

§ 102(e) Date: Nov. 14, 1994

[87] PCT Pub. No.: WO93/24761

PCT Pub. Date: Dec. 9, 1993

[30] Foreign Application Priority Data

Jun. 2, 1992 [SE] Sweden .................................. 9201710

[51] Int. Cl.⁶ ........................................................... B60T 1/06
[52] U.S. Cl. ............................................................. 188/18 A
[58] Field of Search .................................. 188/18 A, 71.6, 188/218 X L, 264 A, 264 AA; 192/107 R; 301/6.8

[56] References Cited

U.S. PATENT DOCUMENTS

| | | | |
|---|---|---|---|
| 3,941,221 | 3/1976 | Pringle | 188/218 X L |
| 4,890,699 | 1/1990 | Megginson | 188/18 A |
| 5,137,123 | 8/1992 | Setogawa | 188/72.2 |
| 5,255,761 | 10/1993 | Zaremsky | 188/18 A |
| 5,348,122 | 9/1994 | Brundrett | 188/18 A |

FOREIGN PATENT DOCUMENTS

| | | |
|---|---|---|
| 0287410A1 | 10/1988 | European Pat. Off. . |
| 468135 | 11/1992 | Sweden . |

*Primary Examiner*—Robert J. Oberleitner
*Assistant Examiner*—C. T. Bartz
*Attorney, Agent, or Firm*—Burns, Doane Swecker & Mathis LLP

[57] ABSTRACT

The invention relates to a wheel hub and brake disc arrangement for a vehicle wheel. A disc-shaped carrier to which the wheel rim is attached includes a tubular portion. The tubular portion of the disc-shaped carrier is affixed by a screw connection to a hub portion rotatably carried by bearing means. A neck portion integral with the disc-shaped carrier radially externally of the screw connection presents an external shaping which meshes with an internal shaping on the brake disc. This arrangement eliminates the need for the screw connection to act as a braking moment transmitting element.

11 Claims, 1 Drawing Sheet

WHEEL HUB AND BRAKE DISC ARRANGEMENT FOR HEAVY VEHICLES

BACKGROUND OF THE INVENTION

1. Field of the Invention

The present invention relates to a wheel hub and brake disc arrangement for heavy vehicles, bolted a hub portion rotatably carried by bearing means on a stub axle, said hub portion presenting a region to which a brake disc is non rotatably affixed, and a disc-shaped carrier affixed to the hub portion via a screw connection, to which carrier a wheel rim is intended to be bolted.

2. Description of Related Art

Disc brakes, which until now have almost without exception only been used on cars and lighter commercial vehicles, have recently been further developed for use in the heaviest category of trucks in which the braking moment can reach 2000 kpm. In the known disc brake type for this class of vehicle the brake disc and the "wheel disc", i.e. the disc-shaped carrier to which the wheel rim is intended to be bolted, is affixed to the wheel hub via a common screw connection. In such a construction, the entire braking moment acts through the screw connection. This implies that the connection must be dimensioned so as to accommodate very large forces. High demands are thus placed on the assembly work during, for example, replacement of brake discs, for example that the correct tightening torque is applied to the common screw connection, in order to eliminate the risk of failure attributable to too great stresses in the connection.

3. Objects and Summary

It is an object of the present invention to provide a wheel hub and brake disc arrangement of the above mentioned type in which the disadvantages of a common screw connection for the brake disc and the disc-shaped carrier can be eliminated.

The present invention relates to a wheel hub and brake disc arrangement for heavy vehicles, comprising a hub portion rotatably carried by bearing means on a stub axle, said hub portion presenting a region to which a brake disc is nonrotatably affixed, and a disc-shaped carrier affixed to the hub portion via a screw connection, to which carrier a wheel rim is intended to be bolted.

This is achieved in accordance with the invention by means of the disc-shaped carrier being integrally formed with a region located radially externally of said screw connection, said region having a non-circular external shaping onto which a brake disc having an opening which presents a corresponding internal shaping is non-rotatably affixed.

By forming an externally shaped disc carrying region integrally with the "wheel disc", an interlocking connection with the brake disc is created in the direction of rotation. The braking moment is thus transmitted through the interlocking connection without having to pass through the screw connection. This implies that the screw connection does not need to be dimensioned to accommodate the very high braking moments which arise during heavy braking of commercial vehicles of the heaviest category.

BRIEF DESCRIPTION OF THE DRAWINGS

The invention will be described in greater detail in the following with reference to the embodiments shown in the attached drawings in which.

DETAILED DESCRIPTION OF PREFERRED EMBODIMENTS

Figure 1:
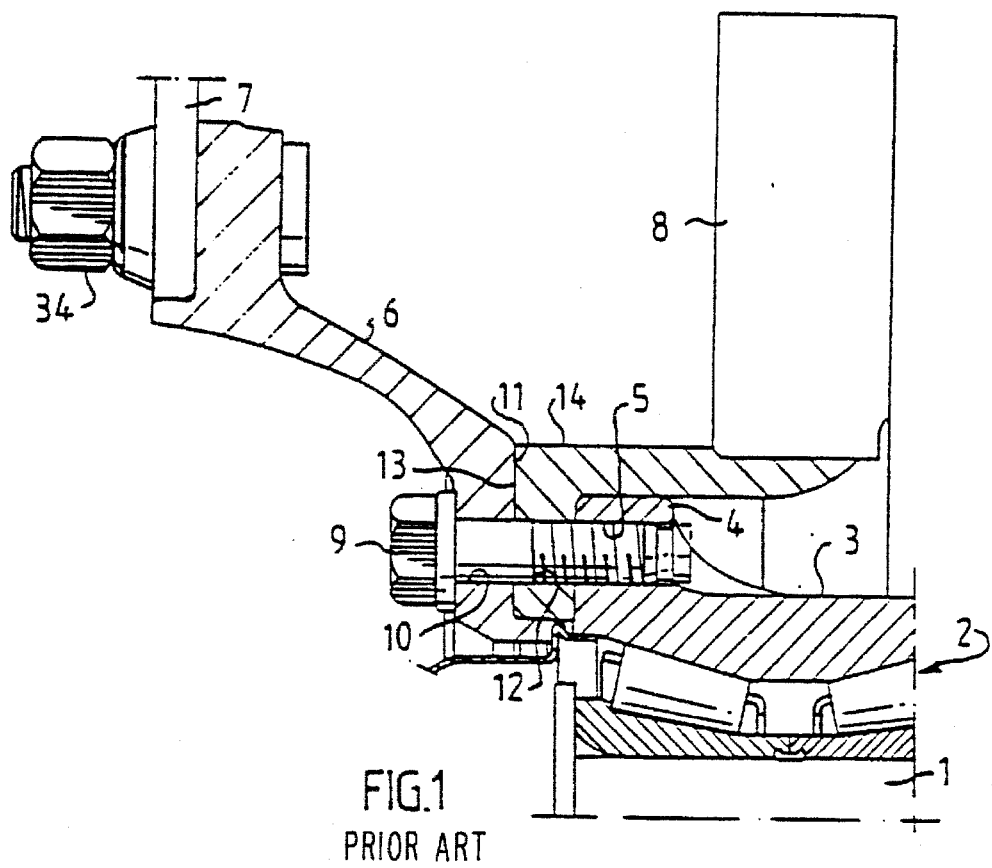
FIG. 1 shows a longitudinal sectional view through a portion of a previously known wheel hub and brake disc arrangement and FIG. 2 shows a corresponding longitudinal sectional view through an embodiment of a wheel hub and brake disc arrangement according to the invention.

The wheel hub and brake disc arrangement in FIG. 1 comprises a stub axle 1 which supports a so called "unit bearing" denoted generally by 2, the outer race 3 of which is formed with a radial ring-shaped flange 4 and forms the actual wheel hub. The flange 4 is provided with a plurality of, for example ten, uniformly distributed threaded bores 5. A disc-shaped carrier 6, the so called wheel disc to which a wheel rim 7 is bolted, and the brake disc 8 are affixed to the flange 4 by means of screws 9 which extend through bores 10 in a radial flange 11 on the wheel disc 6 and bores 12 in a radial flange 13 on a hollow circular portion 14 integrally formed with the brake disc 8.

In the aforegoing described embodiment, the braking moment is transmitted from the brake disc 8 to the wheel rim 7 via the flanges 11 and 13 and the screw connection 9, the screw connection 9 therefore needing to be dimensioned so as to be able to accommodate the entire braking moment.

Figure 2:
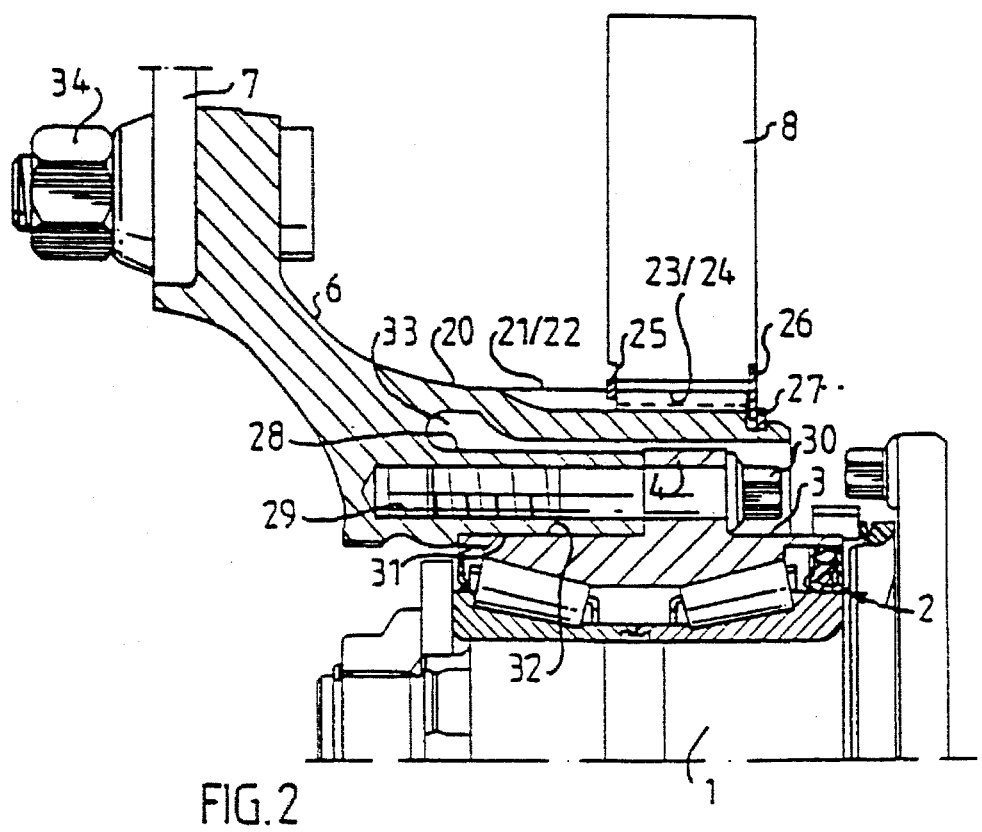

An embodiment of a wheel hub and brake disc arrangement according to the present invention is shown in FIG. 2 where components corresponding to those in FIG. 1 have been denoted by the same figure reference numerals.

The arrangement according to the present invention has a wheel disc 6 which presents an integrally formed cylindrical neck portion 20, the outer surface of which is shaped with alternate V-shaped peaks and troughs 21, 22. The brake disc 8 has a central opening with corresponding peaks and troughs 23, 24 which mesh with the peaks and troughs 22, 21 in the neck portion 20 so as to locate the brake disc 8 in the direction of rotation. The disc 8 is axially located by means of a locking ring 25 accommodated in an outer groove, an inner spring washer 26 which permits restricted axial displacement to the disc 8, and a locking ring 27 accommodated in an inner groove.

The wheel disc 6 is integrally formed with a tubular portion 28 which presents threaded bores 29 into which screws 30 are inserted through the flange 4 on the outer race 3 of the bearing. The inner surface 31 of the portion 28 is preferably sized to be a press fit on the outer surface 32 of the outer race 3.

By means of the described embodiment according to the invention, the need for the screw connection 30 to perform the function of a braking moment transmitting element is eliminated. Instead, the braking moment is transmitted from the brake disc 8 to the wheel rim 7 directly via the neck portion 20 of the wheel rim. The air gap 33 between the neck portion 20 and the tubular portion 28 assists in restricting heat transfer from the brake disc when it is hot to sensitive components such as the bearing and sealing rings. The embodiment according to the invention permits a weaker screw connection to be used than the embodiment in FIG. 1. As shown in FIG. 2, by screwing in the screws 30 from the inside of the hub 3 (i.e. the side facing towards the not shown wheel spindle) the risk of the screws 30 being mistakenly loosened instead of the wheel nuts 34 during replacement of the brake disc is eliminated.

We claim:

1. A hub and brake disc arrangement for a vehicle wheel, comprising:

a hub portion rotatably carried by bearing means on a stub axle, a brake disc carrier connected to the hub portion, a brake disc non-rotatably affixed to the brake disc carrier, a disc-shaped carrier which is affixed to the hub portion via a screw connection means on said disc-shaped carrier for receiving a wheel rim, the brake disc carrier is formed as a single piece with the disc-shaped carrier radially externally of said screw connection, said brake disc carrier having a non-circular external shaping onto which a brake disc having an opening which presents a corresponding internal shaping is non-rotatably fixed.

2. The arrangement according to claim 1, wherein the brake disc carrier forms a neck portion separated from the hub portion with the screw connection by a ring-shaped channel.

3. The arrangement according to claim 1, wherein an outer race of the bearing means forms said hub portion and presents a ring-shaped radial flange to which a tubular portion of the disc-shaped carrier is affixed via said screw connection.

4. The arrangement according to claim 3, wherein the tubular portion is adapted to be press fit on a cylindrical surface of the hub portion.

5. The arrangement according to claim 1, wherein a plurality of screws in the screw connection are screwed into the disc-shaped carrier from a side of the hub portion facing a wheel spindle.

6. The arrangement according to claim 2, wherein an outer race of the bearing means forms said hub portion and presents a ring-shaped radial flange to which a tubular portion of the disc-shaped carrier is affixed via said screw connection.

7. The arrangement according to claim 2, wherein a plurality of screws in the screw connection are screwed into the disc-shaped carrier from a side of a hub portion facing the wheel spindle.

8. The arrangement according to claim 3, wherein a plurality of screws in the screw connection are screwed into the disc-shaped carrier from a side of a hub portion facing the wheel spindle.

9. The arrangement according to claim 4, wherein a plurality of screws in the screw connection are screwed into the disc-shaped carrier from a side of a hub portion facing the wheel spindle.

10. The arrangement according to claim 1, wherein the hub portion is rotatably carried by first and second sets of bearings, the bearings in the first set of bearings positioned at an angle with respect to the bearings in the second set of bearings.

11. The arrangement according to claim 1, wherein only a single brake disc is non-rotatably affixed to the brake disc carrier.

* * * * *